United States Patent
Bennett (10) Patent No.: US 9,855,929 B2
(45) Date of Patent: Jan. 2, 2018

(54) WHEEL CHANGING ASSEMBLY

(71) Applicant: Ortagus Bennett, Piedmont, SC (US)

(72) Inventor: Ortagus Bennett, Piedmont, SC (US)

( * ) Notice: Subject to any disclaimer, the term of this patent is extended or adjusted under 35 U.S.C. 154(b) by 43 days.

(21) Appl. No.: 15/203,892

(22) Filed: Jul. 7, 2016

(65) Prior Publication Data

US 2017/0174188 A1 Jun. 22, 2017

Related U.S. Application Data (60) Provisional application No. 62/387,056, filed on Dec. 22, 2015.

(51) Int. Cl.
| | |
|---|---|
| *B66F 3/08* | (2006.01) |
| *B60S 5/04* | (2006.01) |
| *B66F 5/04* | (2006.01) |
| *B25B 23/145* | (2006.01) |
| *B60B 29/00* | (2006.01) |
| *B60S 9/10* | (2006.01) |

(52) U.S. Cl.
CPC ............ *B60S 5/046* (2013.01); *B25B 23/145* (2013.01); *B60B 29/006* (2013.01); *B60S 9/10* (2013.01); *B66F 5/04* (2013.01)

(58) Field of Classification Search
CPC ...... B66F 1/00; B66F 1/06; B66F 7/00; B66F 7/12
See application file for complete search history.

(56) References Cited

U.S. PATENT DOCUMENTS

| | | | |
|---|---|---|---|
| 5,083,457 A | 1/1992 | Schultz | |
| 6,142,501 A * | 11/2000 | Fogo | B60S 9/02 254/419 |
| 6,286,629 B1 * | 9/2001 | Saunders | B66B 9/0853 187/394 |
| 6,315,079 B1 * | 11/2001 | Berends | B66F 3/46 187/203 |
| 7,088,226 B2 | 8/2006 | McClelland | |
| D561,423 S | 2/2008 | Kuen | |
| 7,667,583 B2 | 2/2010 | Petrucelli | |
| 8,500,095 B1 | 8/2013 | Salcedo | |
| 9,095,966 B2 | 8/2015 | Hsich | |
| 2004/0069979 A1 * | 4/2004 | Hicks | B66F 7/0608 254/122 |

(Continued)

FOREIGN PATENT DOCUMENTS

WO WO2007095199 8/2007

*Primary Examiner* — Lee D Wilson (57) ABSTRACT

A wheel changing assembly for safely changing a wheel of a vehicle includes a jack that comprises a first housing. A first power module, a first microprocessor, a pump and a lift are coupled to and positioned in the first housing. The first microprocessor is operationally coupled to the first power module. The pump is operationally coupled to the first microprocessor. The lift is fluidically coupled to the pump. A plate is coupled to a second end of the lift. A plurality of wheels is coupled to a bottom of the first housing. A camera, a plurality of lights and a locator, which are coupled to and positioned in the plate, are operationally coupled to the first microprocessor. The camera is configured to image an underside of the vehicle during placement of the jack. The locator is configured to signal proper positioning of the jack relative to the frame of the vehicle.

19 Claims, 8 Drawing Sheets

(56) References Cited

U.S. PATENT DOCUMENTS

| | | | |
|---|---|---|---|
| 2012/0211709 A1* | 8/2012 | Givens | B25J 9/1065 |
| | | | 254/93 R |
| 2015/0127216 A1 | 5/2015 | Jackson, Sr. | |
| 2017/0174188 A1* | 6/2017 | Bennett | B60S 5/046 |

* cited by examiner

WHEEL CHANGING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention.
(2) Description of Related Art including information disclosed under 37 CFR 1.97 and 1.98.

The disclosure and prior art relates to wheel changing assemblies and more particularly pertains to a new wheel changing assembly for safely changing a wheel of a vehicle.

BRIEF SUMMARY OF THE INVENTION

An embodiment of the disclosure meets the needs presented above by generally comprising a jack that comprises a first housing. A first power module, a first microprocessor, a pump and a lift are coupled to and positioned in the first housing. The first microprocessor is operationally coupled to the first power module. The pump is operationally coupled to the first microprocessor. The lift is fluidically coupled to the pump. A plate is coupled to a second end of the lift. A plurality of wheels is coupled to a bottom of the first housing. A camera, a plurality of lights and a locator, which are coupled to and positioned in the plate, are operationally coupled to the first microprocessor. The camera is configured to image an underside of the vehicle during placement of the jack. The locator is configured to signal proper positioning of the jack relative to the frame of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
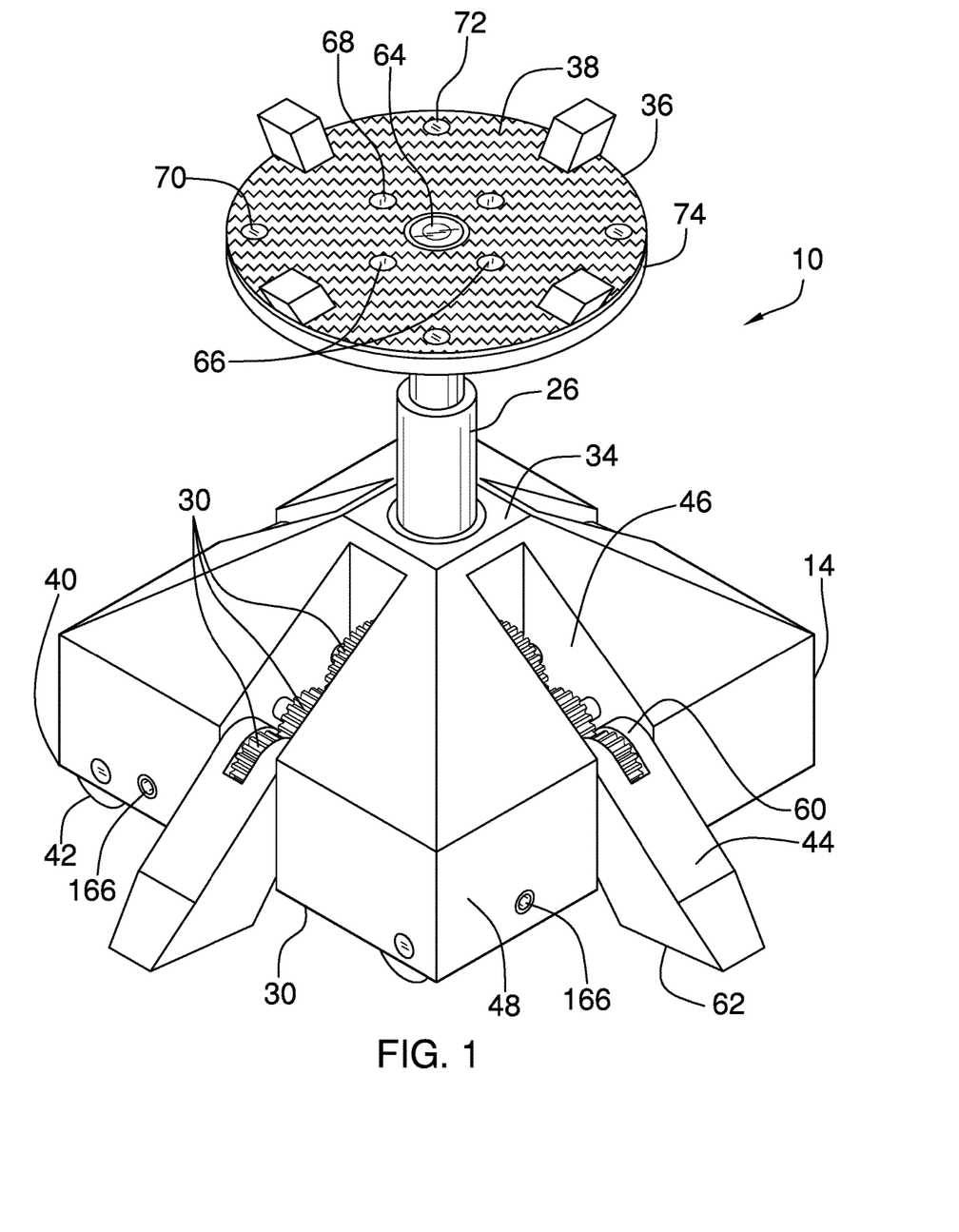
FIG. 1 is an isometric perspective view of a wheel changing assembly according to an embodiment of the disclosure.
Figure 2:
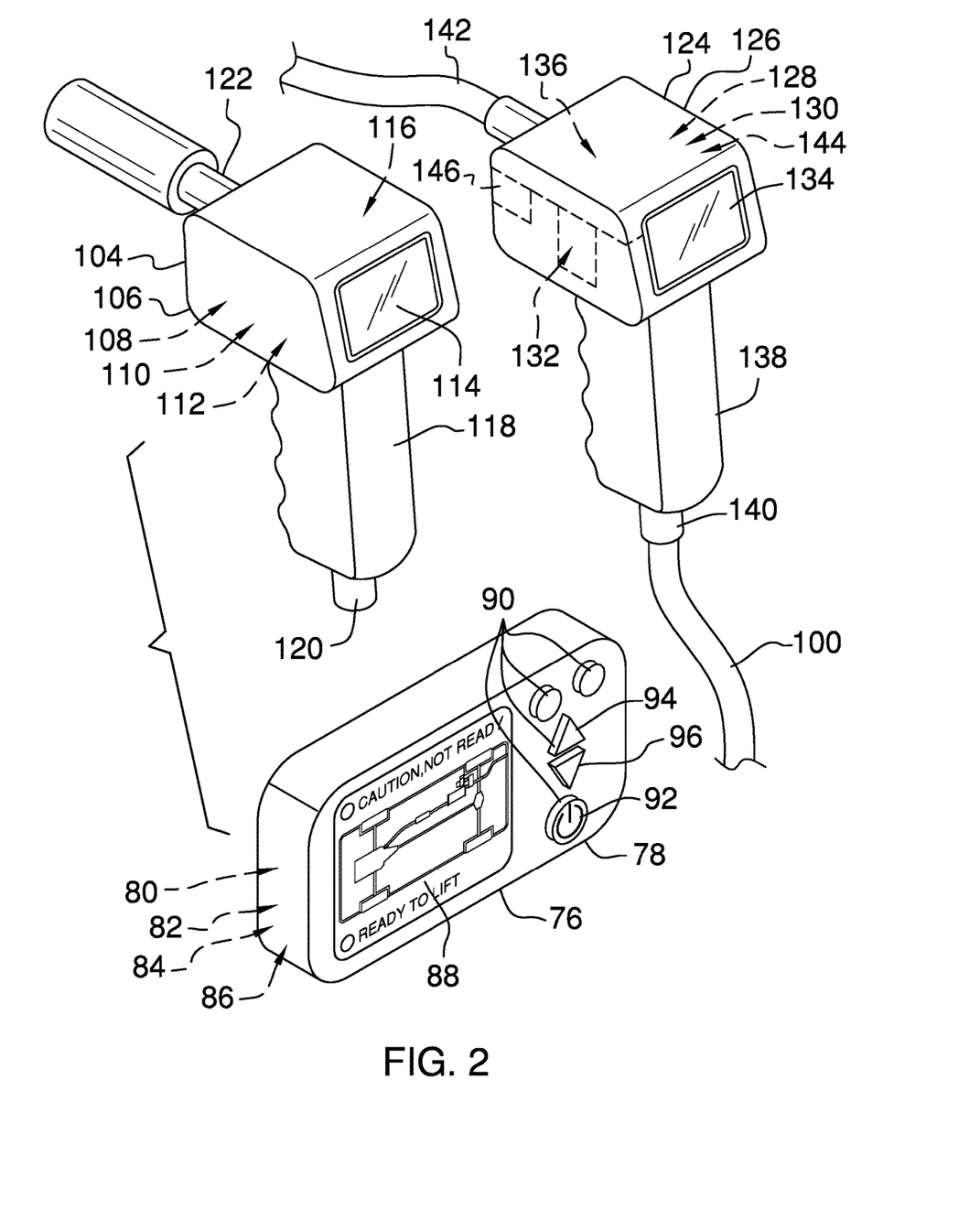
FIG. 2 is an isometric perspective view of an embodiment of the disclosure.
Figure 3:
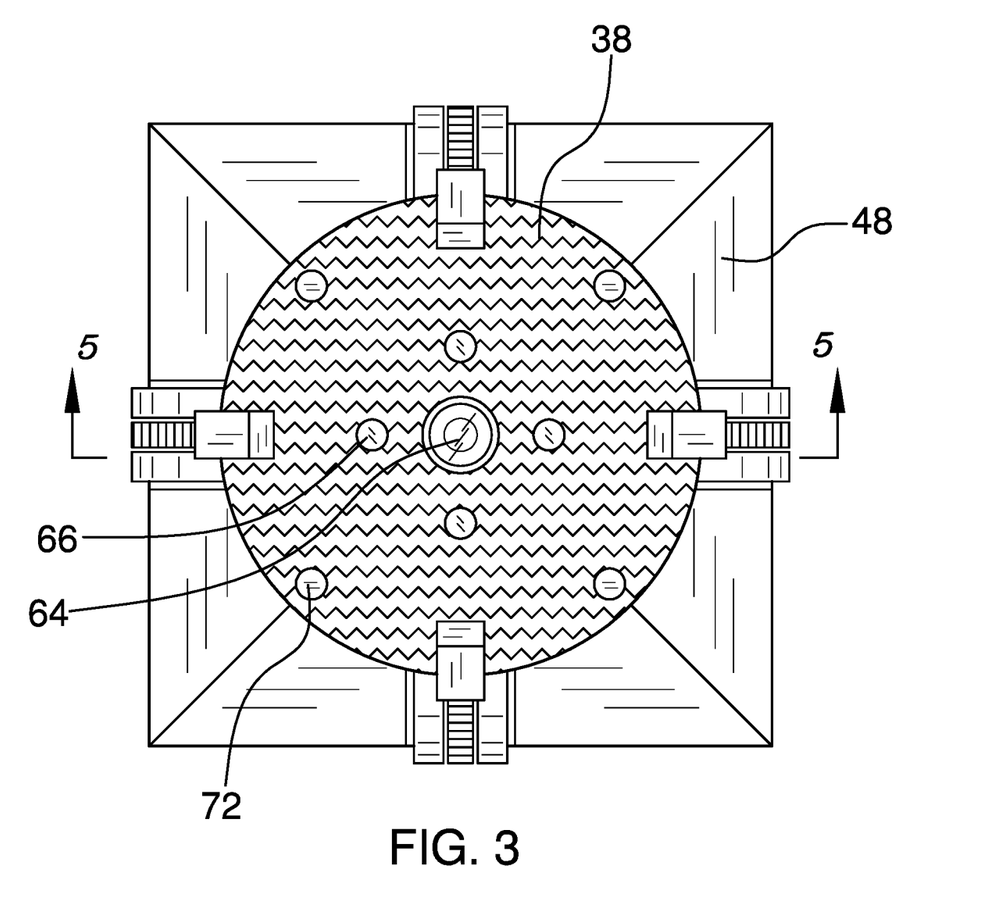
FIG. 3 is a top view of an embodiment of the disclosure.
Figure 4:
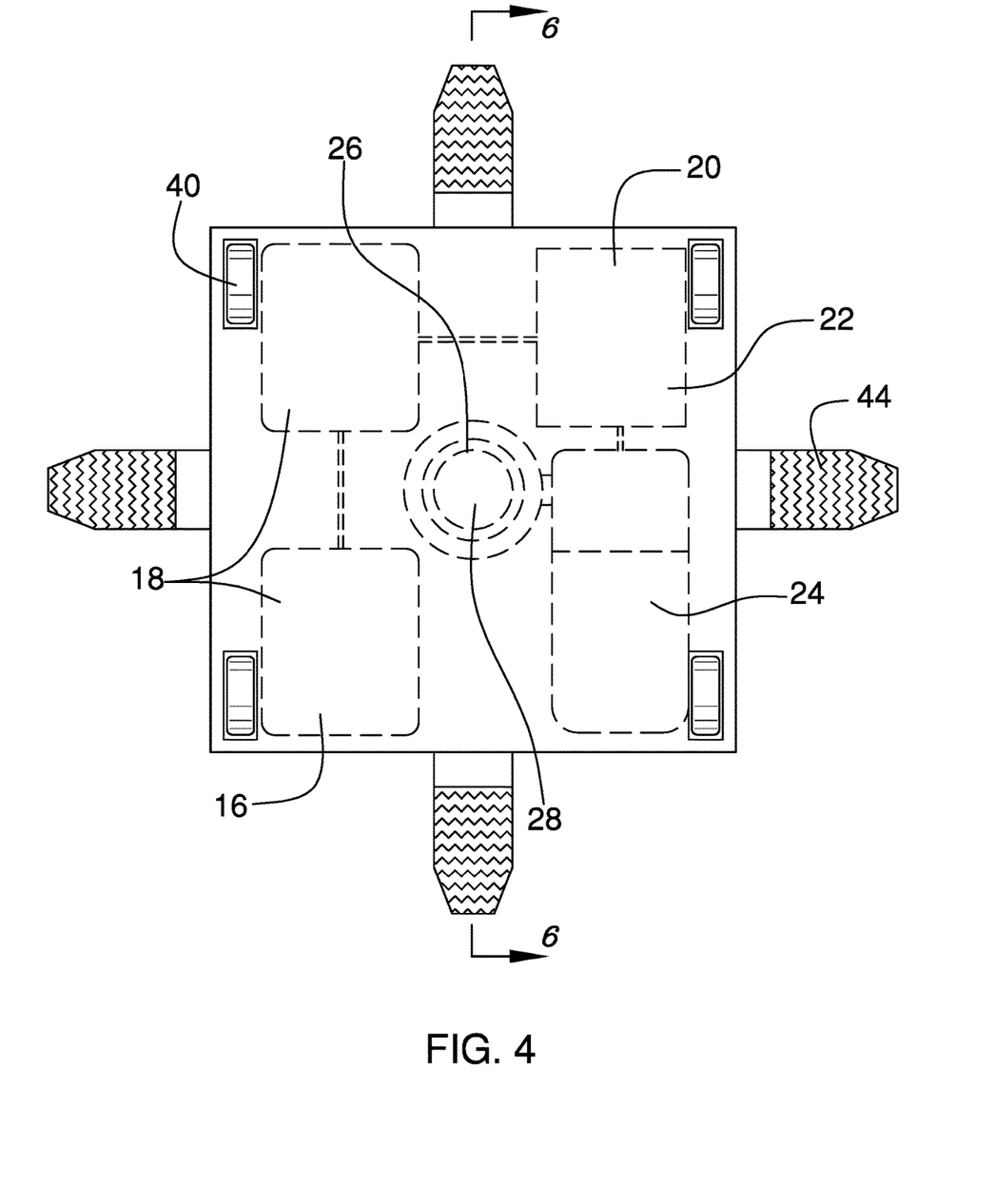
FIG. 4 is a bottom view of an embodiment of the disclosure.
Figure 5:
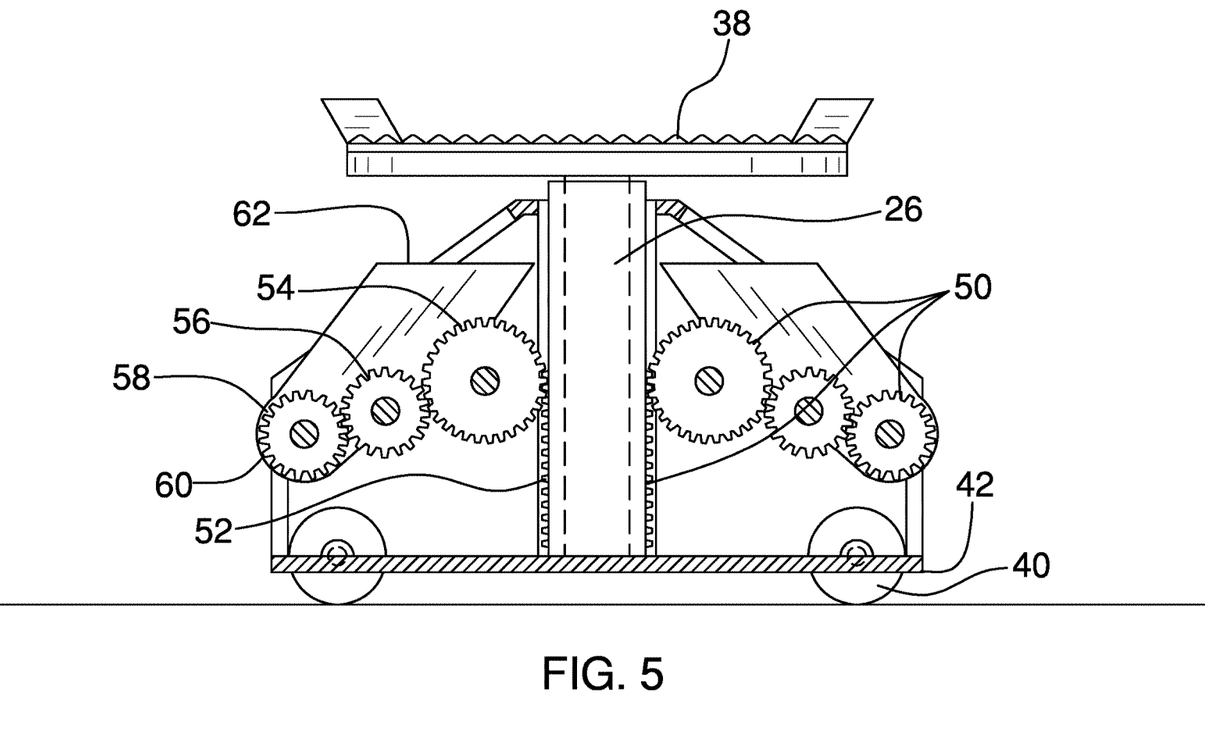
FIG. 5 is a cross-sectional view of an embodiment of the disclosure.
Figure 6:
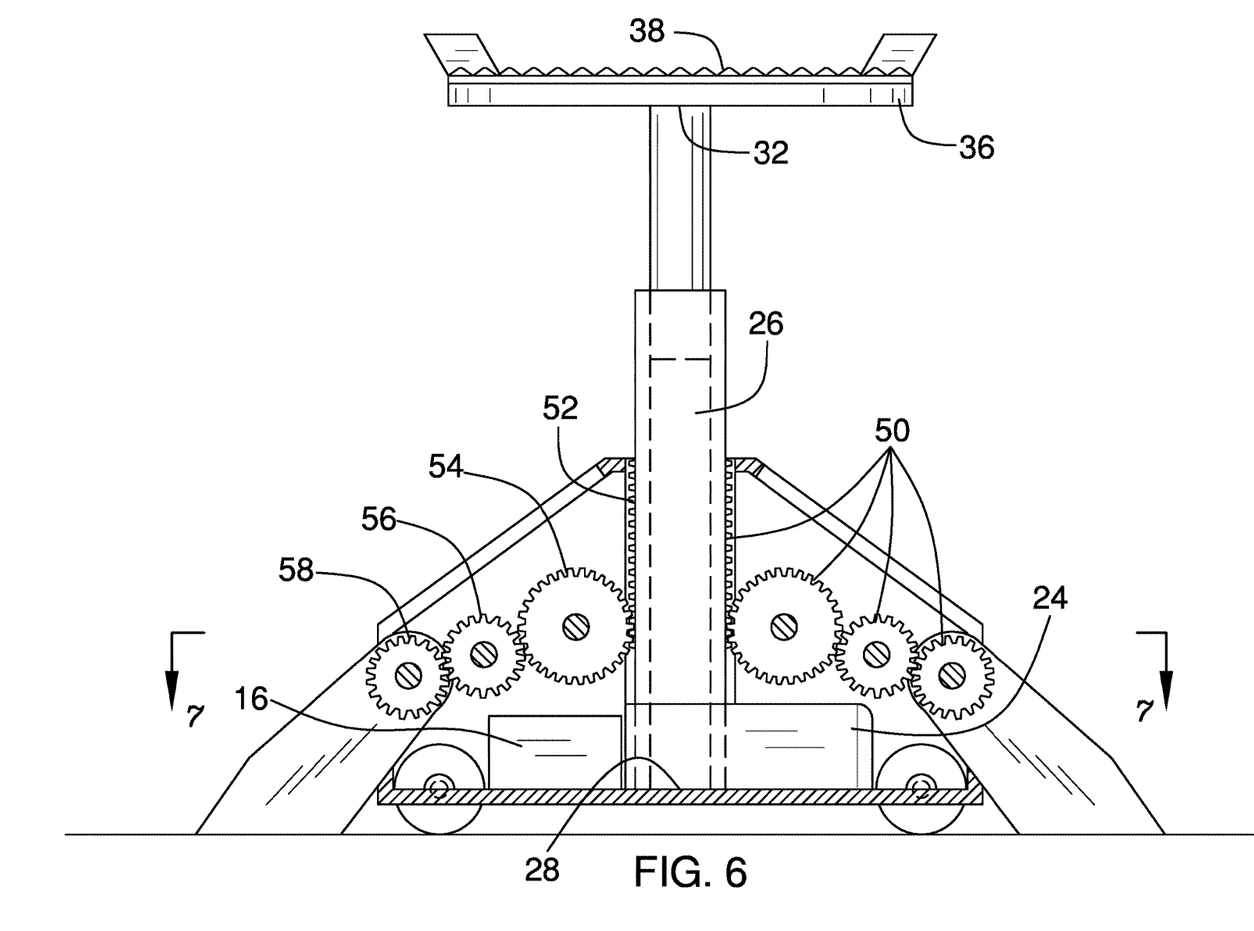
FIG. 6 is a cross-sectional view of an embodiment of the disclosure.
Figure 7:
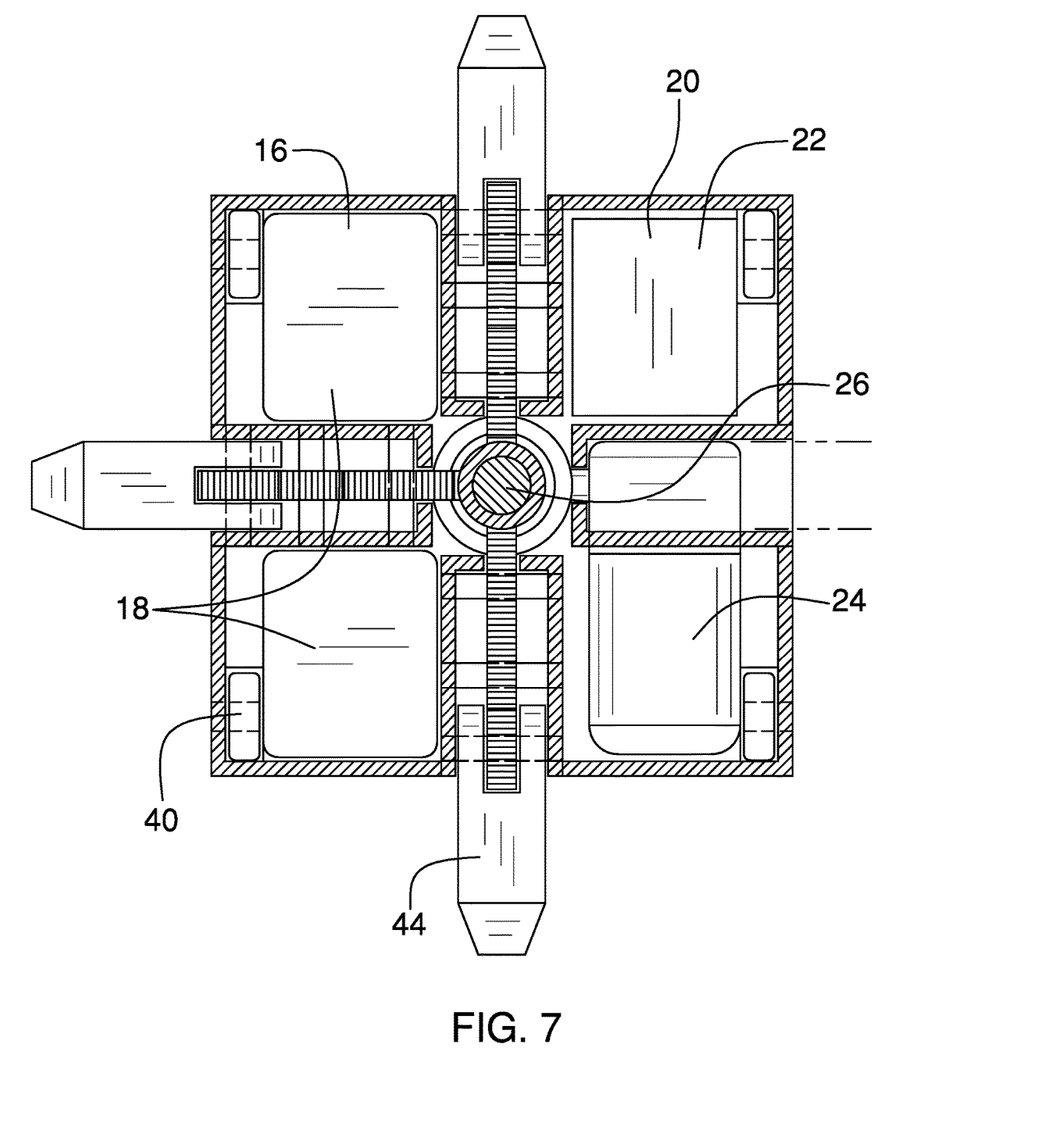
FIG. 7 is a cross-sectional view of an embodiment of the disclosure.
Figure 8:
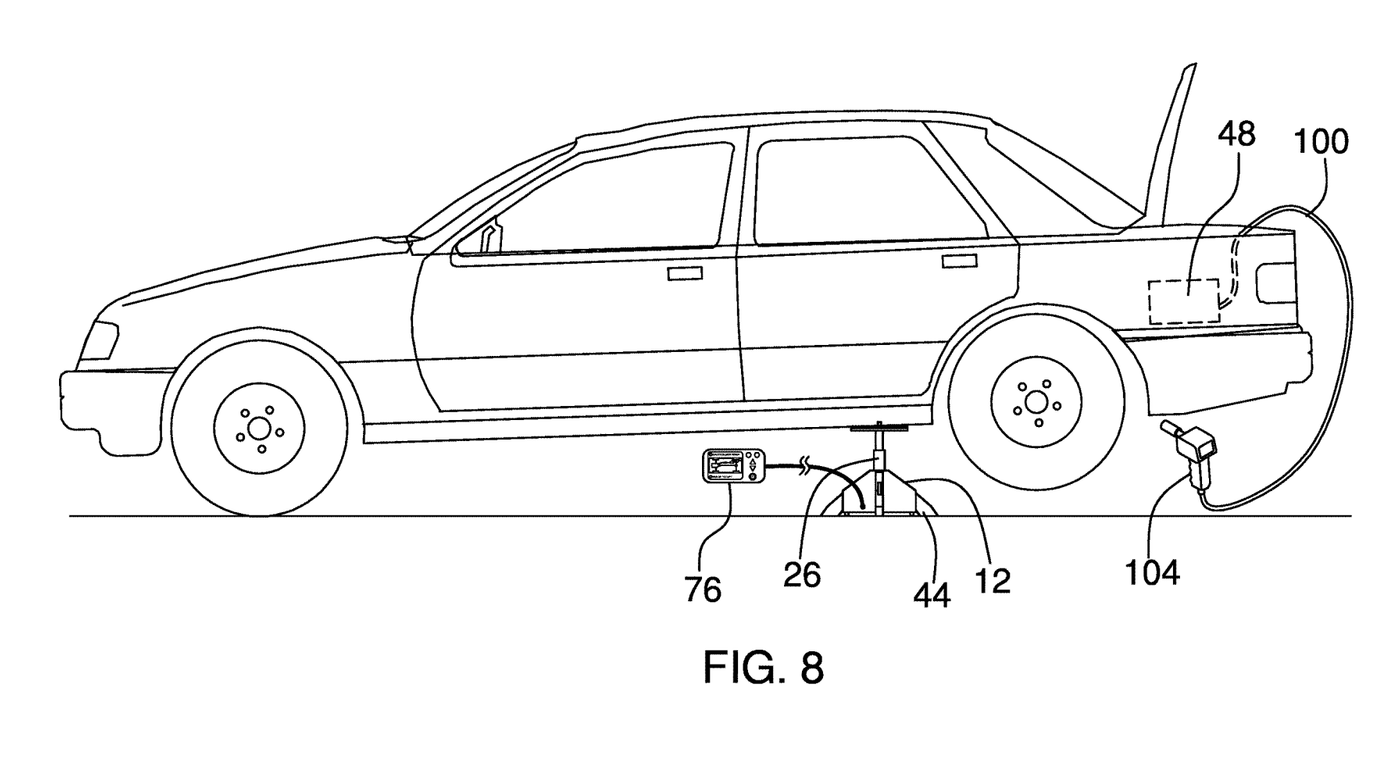
FIG. 8 is an in-use view of an embodiment of the disclosure.

With reference now to the drawings, and in particular to FIGS. 1 through 8 thereof, a new wheel changing assembly embodying the principles and concepts of an embodiment of the disclosure and generally designated by the reference numeral 10 will be described.

As best illustrated in FIGS. 1 through 8, the wheel changing assembly 10 generally comprises a jack 12 that comprises a first housing 14. The first housing 14 is substantially rectangularly box shaped. A first power module 16 is coupled to and positioned in the first housing 14. The first power module 16 comprises a plurality of first batteries 18. The first batteries 18 are rechargeable. The first power module 16 comprises two first batteries 18. The first power module 16 may be configured for reversible coupling to an electrical circuit of a vehicle.

A first microprocessor 20 is coupled to and positioned in the first housing 14. The first microprocessor 20 is operationally coupled to the first power module 16. The first microprocessor 20 comprises a first communicator 22. The first communicator 22 is enabled to transmit and receive wireless signals. The first communicator 22 is wireless personal access networking enabled, such as under the trademark "BLUETOOTH".

A pump 24 is coupled to and positioned in the first housing 14. The pump 24 is operationally coupled to the first microprocessor 20. The pump 24 is hydraulic. A lift 26 is coupled to and positioned in the first housing 14. The lift 26 is fluidically coupled to the pump 24. The lift 26 has a first end 28 that is coupled to a bottom 30 of the first housing 14. The lift 26 has a second end 32 that is selectively extensible through a top 34 of the first housing 14.

A plate 36 is coupled to the second end 32 of the lift 26. The plate 36 is substantially circular. The plate 36 has an upper surface 38, which is textured. The plate 36 is configured to abut a frame of a vehicle and the upper surface 38 is configured to deter slippage of the plate 36 relative to the frame.

A plurality of wheels 40 is coupled to the bottom 30 of the first housing 14. The plurality of wheels 40 comprises wheels 40 positioned singly proximate to each lower corner 42 of the first housing 14.

A plurality of legs 44 is gearedly coupled to the first housing 14. Each leg 44 is gearedly coupled to the lift 26, such that the legs 44 are positioned to extend from the first housing 14 as the lift 26 is motivated upwardly by the pump 24. Each leg 44 is positioned in and extendable from a respective recess 46. Each recess 46 is positioned in a respective side 48 of the first housing 14. The plurality of legs 44 comprises four legs 44.

Each leg 44 comprises a gear set 50. Each gear set 50 comprises a rack gear 52 that is coupled to the lift 26. A pinion gear 54 is rotationally coupled to the first housing 14 within the recess 46. The pinion gear 54 is gearedly coupled to the rack gear 52. A center sprocket 56 is rotationally coupled to the first housing 14 within the recess 46. The center sprocket 56 is gearedly coupled to the pinion gear 54. An end sprocket 58 is fixedly positioned at a first terminus 60 of the leg 44. The first terminus 60 of the leg 44 is rotationally coupled to the first housing 14 within the recess 46. The end sprocket 58 is gearedly coupled to the center sprocket 56. Upward movement of the rack gear 52 compels rotation of the pinion gear 54, which compels, sequentially, rotation of the center sprocket 56 and the end sprocket 58. The leg 44 is compelled from a stowed position within the recess 46 to an extended position in which a second terminus 62 of the leg 44 is in contact with a surface below the vehicle.

A camera 64 is coupled to and positioned in the plate 36. The camera 64 is operationally coupled to the first microprocessor 20. The camera 64 is configured to image an underside of the vehicle during placement of the jack 12. The camera 64 is substantially centrally positioned in the plate 36. The first microprocessor 20 may also be in communication through the wireless personal access network to a nearby extrinsic camera such as a rear view camera of the vehicle or any other network capable camera within range. Base cameras 166 are coupled to the jack 12 and distributed around the jack 12 to provide images in each direction around the jack 12. The base cameras 166 may also be used as motion detectors monitoring an area surrounding the jack 12.

A plurality of lights 66 is coupled to and positioned in the plate 36. The lights 66 are operationally coupled to the first microprocessor 20. The lights 66 are configured to project light upwardly from the plate 36. In one embodiment, the lights 66 comprise light emitting diodes 68. The plurality of lights 66 is squarely arrayed around the camera 64. The plurality of lights 66 comprises four lights 66 positioned proximate to the camera 64.

A locator 70 is coupled to and positioned in the plate 36. The locator 70 is operationally coupled to the first microprocessor 20. The locator 70 is configured to signal the first microprocessor 20 when the jack 12 is properly positioned relative to the frame of the vehicle. The locator 70 comprises a plurality of sensors 72. The sensors 72 are metal detecting. The plurality of sensors 72 comprises four sensors 72 substantially evenly spaced proximate to a circumference 74 of the plate 36.

A controller 76 is operationally coupled to the first microprocessor 20. The controller 76 is positioned to signal the first microprocessor 20. In one embodiment, the controller 76 is wirelessly coupled to the first microprocessor 20. The controller 76 comprises a second housing 78. A second power module 80 is coupled to and positioned in the second housing 78. The second power module 80 comprises a second battery 82. A second microprocessor 84 is coupled to and positioned in the second housing 78. The second microprocessor 84 is operationally coupled to the second power module 80. The second microprocessor 84 comprises a second communicator 86. The second communicator 86 is enabled to transmit and receive wireless signals. The second communicator 86 is Bluetooth enabled.

A first display 88 is positioned on the second housing 78. The first display 88 is operationally coupled to the second microprocessor 84. A control panel 90 is coupled to and positioned on the second housing 78. The control panel 90 is operationally coupled to the second microprocessor 84. The control panel 90 comprises an on/off button 92, an up button 94, and a down button 96.

The assembly 10 comprises a compressor 98. The compressor 98 is configured to couple to the vehicle. The compressor 98 is configured for operational coupling to the electrical system of the vehicle. An air hose 100 is coupled to and extends from the compressor 98. A first connector 102 is coupled to the air hose 100 distal from the compressor 98.

A torque wrench 104 is selectively couplable to the first connector 102. The torque wrench 104 is positioned to couple to the first connector 102. The torque wrench 104 is configured to rotate lug nuts of a wheel. The torque wrench 104 comprises a third housing 106. A third power module 108 is coupled to and positioned in the third housing 106. The third power module 108 comprises a third battery 110. A third microprocessor 112 is coupled to and positioned in the third housing 106. The third microprocessor 112 is operationally coupled to the third power module 108.

A second display 114 is positioned on the third housing 106. The second display 114 is operationally coupled to the third microprocessor 112. The second display 114 is coupled to the third microprocessor 112. The second display 114 is positioned to present torque specifications applicable to fastening of the lug nuts.

A first actuator 116 is coupled to and positioned in the third housing 106. A first handgrip 118 extends from the third housing 106. A second connector 120 is coupled to the first handgrip 118. The second connector 120 is complementary to the first connector 102. The second connector 120 is positioned to couple to the first connector 102 such that the first actuator 116 is fluidically coupled to the compressor 98. A third connector 122 is coupled to the first actuator 116 and extends from the third housing 106. The third connector 122 is configured to selectively couple to a socket. The third microprocessor 112 is positioned to compel the first actuator 116 to motivate rotation of the third connector 122 to rotate a lug nut positioned in the socket that is coupled to the third connector 122 to the torque specification provided by the manufacturer of the wheel.

An air gun 124 is selectively couplable to the first connector 102. The air gun 124 is positioned to couple to the first connector 102 such that the air gun 124 is positioned to couple to an air stem of a tire for addition of air to the wheel. The air gun 124 comprises a fourth housing 126. A fourth power module 128 is coupled to and positioned in the fourth housing 126. The fourth power module 128 comprises a fourth battery 130. A fourth microprocessor 132 is coupled to and positioned in the fourth housing 126. The fourth microprocessor 132 is operationally coupled to the fourth power module 128.

A third display 134 is positioned on the fourth housing 126. The third display 134 is operationally coupled to the fourth microprocessor 132. The third display 134 is positioned to present pressure readings from the wheel to a user. This may be achieved through a direct measurement in a conventional manner or through communication with a tire pressure monitoring system of the vehicle. A second actuator 136 is coupled to and positioned in the fourth housing 126. The second actuator 136 is operationally coupled to the fourth microprocessor 132. A second handgrip 138 extends from the fourth housing 126. A fourth connector 140 is coupled to the second handgrip 138. The fourth connector 140 is complementary to the first connector 102. An outflow tube 142 is coupled to the fourth housing 126. The outflow tube 142 is fluidically connected to the fourth connector 140.

A receiver 144 is coupled to and positioned in the fourth housing 126. The receiver 144 is operationally coupled to the fourth microprocessor 132. The receiver 144 is radio frequency enabled. In another embodiment the receiver 144 is radio frequency and infrared light 66 enabled. The receiver 144 is in communication with a sensor unit that comprises the vehicle manufacturer installed Tire Pressure Monitoring Sensors in the wheels of the vehicle. The sensor unit is configured to wirelessly transmit pressure measurements. The fourth microprocessor 132 is positioned to respond to pressure readings relayed from the receiver 144 to motivate the air gun 124 to send air via the outflow tube 142 through the stem valve.

The present invention also anticipates the assembly 10 comprising a plurality of motion sensors 72. The plurality of motion sensors 72 would be operationally coupled to the controller 76. Each motion sensor would be positioned on the jack 12 such that the jack 12 is configured to detect motion in the vicinity of the jack 12 and to signal the controller 76 to display an alert on the first display 88.

The camera 64 and each extrinsic camera as described above may be operationally coupled to one or all of the first display 88, the second display 114, and the third display 134. The extrinsic cameras may be used to view surrounding areas for foot and vehicle traffic to enhance safety of a person using the assembly 10.

A heat sensor 146, which may be an infrared heat sensor, may be coupled to the fourth housing 126 in a conventional manner and directed by manipulation of the fourth housing 126 to detect heat changes on the surface of the tire. Thus, when air is introduced into the tire, changes in the heat detected at the tire surface may be used to indicate the presence of a leak in the tire. The heat sensor 146 may be operationally coupled to the third microprocessor 132 and the third display 134 in a conventional manner to display a temperature detected by the heat sensor 146.

In use, the jack 12 is positionable between a surface and the frame of a vehicle by rolling the jack 12 on the wheels 40. Once the jack 12 is correctly positioned with the aid of the camera 64 and the locator 70, the controller 76 is positioned to signal the first microprocessor 20 to extend the lift 26 to raise the vehicle. The compressor 98 is positioned to power the torque wrench 104 to loosen and tighten the lug nuts coupling the wheel to the vehicle. The air gun 124 is positioned to inflate the tire of the wheel to the specification recommended by the manufacturer.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wheel changing assembly comprising:
    a jack comprising a first housing;
    a first power module coupled to and positioned in said first housing;
    a first microprocessor coupled to and positioned in said first housing, said first microprocessor being operationally coupled to said first power module;
    a pump coupled to and positioned in said first housing, said pump being operationally coupled to said first microprocessor;
    a lift coupled to and positioned in said first housing, said lift being fluidically coupled to said pump;
    a plate coupled to a second end of said lift;
    a plurality of wheels coupled to a bottom of said first housing;
    a camera coupled to and positioned in said plate, said camera being operationally coupled to said first microprocessor, wherein said camera is configured to image an underside of the vehicle during placement of said jack;
    a plurality of lights coupled to and positioned in said plate, said lights being operationally coupled to said first microprocessor, wherein said lights are configured to project light upwardly from said plate;
    a locator coupled to and positioned in said plate, said locator being operationally coupled to said first microprocessor, wherein said locator is configured to signal said first microprocessor when said jack is properly positioned relative to the frame of the vehicle; and
    a controller operationally coupled to said first microprocessor, wherein said controller is positioned to signal said first microprocessor.

2. The assembly of claim 1, further comprising:
    said first housing being substantially rectangularly box shaped;
    said pump being hydraulic;
    said lift having a first end coupled to a bottom of said first housing, said lift having a second end selectively extensible through a top of said first housing;
    said plate being substantially circular, said plate having an upper surface, said upper surface being textured, such that said plate is configured for abutment to a frame of a vehicle and wherein said upper surface is configured to deter slippage of said plate relative to the frame; and
    said plurality of wheels comprising wheels positioned singly proximate to each lower corner of said first housing.

3. The assembly of claim 1, further including said first power module comprising a plurality of first batteries, said first batteries being rechargeable, said first power module comprising two first batteries.

4. The assembly of claim 1, further including said first microprocessor comprising a first communicator, said first communicator being enabled for transmission and receipt of wireless signals, said first communicator being wireless personal access networking enabled.

5. The assembly of claim 1, further including a plurality of legs gearedly coupled to said first housing, each said leg being gearedly coupled to said lift, wherein said legs are positioned to extend from said first housing as said lift is motivated upwardly by said pump, each said leg being positioned in and extendable from a respective recess, each said recess being positioned in a respective side of said first housing, said plurality of legs comprising four said legs.

6. The assembly of claim 5, further including each said leg comprising a gear set, each said gear set comprising:
a rack gear coupled to said lift;
a pinion gear rotationally coupled to said first housing within said recess, said pinion gear being gearedly coupled to said rack gear;
a center sprocket rotationally coupled to said first housing within said recess, said center sprocket being gearedly coupled to said pinion gear;
an end sprocket fixedly positioned at a first terminus of said leg, said first terminus of said leg being rotationally coupled to said first housing within said recess, said end sprocket being gearedly coupled to said center sprocket; and
wherein upward movement of said rack gear compels rotation of said pinion gear compelling sequentially rotation of said center sprocket and said end sprocket, wherein said leg is compelled from a stowed position within said recess to an extended position wherein a second terminus of said leg is in contact with a surface below the vehicle.

7. The assembly of claim 1, further including said camera being substantially centrally positioned in said plate.

8. The assembly of claim 1, further including said lights comprising light emitting diodes, said plurality of lights being squarely arrayed around said camera, said plurality of lights comprising four said lights positioned proximate to said camera.

9. The assembly of claim 1, further including said locator comprising a plurality of sensors, said sensors being metal detecting, said plurality of sensors comprising four sensors substantially evenly spaced proximate to a circumference of said plate.

10. The assembly of claim 1, further including said controller being wirelessly coupled to said first microprocessor.

11. The assembly of claim 10, further including said controller comprising:
a second housing;
a second power module coupled to and positioned in said second housing, said second power module comprising a second battery;
a second microprocessor coupled to and positioned in said second housing, said second microprocessor being operationally coupled to said second power module, said second microprocessor comprising a second communicator, said second communicator being enabled for transmission and receipt of wireless signals, said second communicator being Bluetooth enabled;
a first display positioned on said second housing, said first display being operationally coupled to said second microprocessor; and
a control panel coupled to and positioned on said second housing, said control panel being operationally coupled to said second microprocessor, said control panel comprising an On/Off button, an Up button, and a Down button.

12. The assembly of claim 1, further comprising:
a compressor, said compressor being configured for coupling to the vehicle, said compressor being configured for operational coupling to the electrical system of the vehicle;
an air hose coupled to and extending from said compressor;
a first connector coupled to said air hose distal from said compressor; and
a torque wrench, said torque wrench being selectively couplable to said first connector, wherein said torque wrench is positioned to couple to said first connector such that said torque wrench is configured to rotate lug nuts of a wheel.

13. The assembly of claim 12, further including said torque wrench comprising:
a third housing;
a third power module coupled to and positioned in said third housing, said third power module comprising a third battery;
a third microprocessor coupled to and positioned in said third housing, said third microprocessor being operationally coupled to said third power module;
a second display positioned on said third housing, said second display being operationally coupled to said third microprocessor, wherein said second display is coupled to said third microprocessor such that said second display is positioned to present torque specifications applicable to fastening of the lug nuts;
a first actuator coupled to and positioned in said third housing;
a first handgrip extending from said third housing;
a second connector coupled to said first handgrip, said second connector being complementary to said first connector, such that said second connector is positioned to couple to said first connector wherein said first actuator is fluidically coupled to said compressor;
a third connector coupled to said first actuator and extending from said third housing, said third connector being configured to selectively couple to a socket; and
wherein third microprocessor is positioned to compel said first actuator to motivate rotation of said third connector to rotate a lug nut positioned in the socket coupled to said third connector to the torque specification provided by the manufacturer of the wheel.

14. The assembly of claim 12, further including an air gun, said air gun being selectively couplable to said first connector, wherein said air gun is positioned to couple to said first connector such that said air gun is positioned to couple to an air stem of a tire for addition of air to the wheel.

15. The assembly of claim 14, further including said air gun comprising:
a fourth housing;
a fourth power module coupled to and positioned in said fourth housing, said fourth power module comprising a fourth battery;
a fourth microprocessor coupled to and positioned in said fourth housing, said fourth microprocessor being operationally coupled to said fourth power module;
a third display positioned on said fourth housing, said third display being operationally coupled to said fourth microprocessor, wherein said third display is positioned to present pressure readings for the wheel;

a second actuator coupled to and positioned in said fourth housing, said second actuator being operationally coupled to said fourth microprocessor;

a second handgrip extending from said fourth housing;

a fourth connector coupled to said second handgrip, said fourth connector being complementary to said first connector; and an outflow tube coupled to said fourth housing, said outflow tube being fluidically connected to said fourth connector.

16. The assembly of claim 15, further including a receiver coupled to and positioned in said fourth housing, said receiver being operationally coupled to said fourth microprocessor, said receiver being radio frequency enabled, said receiver being in communication with a sensor unit comprising a vehicle manufacturer installed Tire Pressure Monitoring Sensor, wherein the sensor unit is configured to measure pressure and positioned to send pressure readings to said receiver, wherein said fourth microprocessor is positioned to respond to pressure readings relayed from said receiver to motivate said air gun to send air via said outflow tube through the stem valve.

17. The assembly of claim 16, further including further including said receiver being radio frequency and infrared light enabled.

18. A wheel changing assembly comprising:

a jack comprising a first housing, said first housing being substantially rectangularly box shaped;

a first power module coupled to and positioned in said first housing, said first power module comprising a plurality of first batteries, said first batteries being rechargeable, said first power module comprising two first batteries;

a first microprocessor coupled to and positioned in said first housing, said first microprocessor being operationally coupled to said first power module, said first microprocessor comprising a first communicator, said first communicator being enabled for transmission and receipt of wireless signals, said first communicator being Bluetooth enabled;

a pump coupled to and positioned in said first housing, said pump being operationally coupled to said first microprocessor, said pump being hydraulic;

a lift coupled to and positioned in said first housing, said lift being fluidically coupled to said pump, said lift having a first end coupled to a bottom of said first housing, said lift having a second end selectively extensible through a top of said first housing;

a plate coupled to said second end of said lift, said plate being substantially circular, said plate having an upper surface, said upper surface being textured, such that said plate is configured for abutment to a frame of a vehicle and wherein said upper surface is configured to deter slippage of said plate relative to the frame;

a plurality of wheels coupled to said bottom of said first housing, said plurality of wheels comprising wheels positioned singly proximate to each lower corner of said first housing;

a plurality of legs gearedly coupled to said first housing, each said leg being gearedly coupled to said lift, wherein said legs are positioned to extend from said first housing as said lift is motivated upwardly by said pump, each said leg being positioned in and extendable from a respective recess, each said recess being positioned in a respective side of said first housing, said plurality of legs comprising four said legs, each said leg comprising a gear set, each said gear set comprising:

a rack gear coupled to said lift, a pinion gear rotationally coupled to said first housing within said recess, said pinion gear being gearedly coupled to said rack gear, a center sprocket rotationally coupled to said first housing within said recess, said center sprocket being gearedly coupled to said pinion gear, an end sprocket fixedly positioned at a first terminus of said leg, said first terminus of said leg being rotationally coupled to said first housing within said recess, said end sprocket being gearedly coupled to said center sprocket, and wherein upward movement of said rack gear compels rotation of said pinion gear compelling sequentially rotation of said center sprocket and said end sprocket, wherein said leg is compelled from a stowed position within said recess to an extended position wherein a second terminus of said leg is in contact with a surface below the vehicle;

a camera coupled to and positioned in said plate, said camera being operationally coupled to said first microprocessor, wherein said camera is configured to image an underside of the vehicle during placement of said jack, said camera being substantially centrally positioned in said plate;

a plurality of lights coupled to and positioned in said plate, said lights being operationally coupled to said first microprocessor, wherein said lights are configured to project light upwardly from said plate, said lights comprising light emitting diodes, said plurality of lights being squarely arrayed around said camera, said plurality of lights comprising four said lights positioned proximate to said camera;

a locator coupled to and positioned in said plate, said locator being operationally coupled to said first microprocessor, wherein said locator is configured to signal said first microprocessor when said jack is properly positioned relative to the frame of the vehicle, said locator comprising a plurality of sensors, said sensors being metal detecting, said plurality of sensors comprising four sensors substantially evenly spaced proximate to a circumference of said plate;

a controller operationally coupled to said first microprocessor, wherein said controller is positioned to signal said first microprocessor, said controller being wirelessly coupled to said first microprocessor, said controller comprising:

a second housing, a second power module coupled to and positioned in said second housing, said second power module comprising a second battery, a second microprocessor coupled to and positioned in said second housing, said second microprocessor being operationally coupled to said second power module, said second microprocessor comprising a second communicator, said second communicator being enabled for transmission and receipt of wireless signals, said second communicator being wireless personal access networking enabled, a first display positioned on said second housing, said first display being operationally coupled to said second microprocessor, and a control panel coupled to and positioned on said second housing, said control panel being operationally coupled to said second microprocessor, said control panel comprising an on/off button, an up button, and a down button;
a compressor, said compressor being configured for coupling to the vehicle, said compressor being configured for operational coupling to the electrical system of the vehicle;
an air hose coupled to and extending from said compressor;
a first connector coupled to said air hose distal from said compressor;
a torque wrench, said torque wrench being selectively couplable to said first connector, wherein said torque wrench is positioned to couple to said first connector such that said torque wrench is configured to rotate lug nuts of a wheel, said torque wrench comprising:
 a third housing,
 a third power module coupled to and positioned in said third housing, said third power module comprising a third battery,
 a third microprocessor coupled to and positioned in said third housing, said third microprocessor being operationally coupled to said third power module,
 a second display positioned on said third housing, said second display being operationally coupled to said third microprocessor, wherein said second display is coupled to said third microprocessor such that said second display is positioned to present torque specifications applicable to fastening of the lug nuts,
 a first actuator coupled to and positioned in said third housing,
 a first handgrip extending from said third housing,
 a second connector coupled to said first handgrip, said second connector being complementary to said first connector, such that said second connector is positioned to couple to said first connector wherein said first actuator is fluidically coupled to said compressor,
 a third connector coupled to said first actuator and extending from said third housing, said third connector being configured to selectively couple to a socket, and
 wherein third microprocessor is positioned to compel said first actuator to motivate rotation of said third connector to rotate a lug nut positioned in the socket coupled to said third connector to the torque specification provided by the manufacturer of the wheel;
an air gun, said air gun being selectively couplable to said first connector, wherein said air gun is positioned to couple to said first connector such that said air gun is positioned to couple to an air stem of a tire for addition of air to the wheel, said air gun comprising
 a fourth housing,
 a fourth power module coupled to and positioned in said fourth housing, said fourth power module comprising a fourth battery,
 a fourth microprocessor coupled to and positioned in said fourth housing, said fourth microprocessor being operationally coupled to said fourth power module,
 a third display positioned on said fourth housing, said third display being operationally coupled to said fourth microprocessor, wherein said third display is positioned to present pressure readings for the wheel,
 a second actuator coupled to and positioned in said fourth housing, said second actuator being operationally coupled to said fourth microprocessor,
 a second handgrip extending from said fourth housing,
 a fourth connector coupled to said second handgrip, said fourth connector being complementary to said first connector,
 an outflow tube coupled to said fourth housing, said outflow tube being fluidically connected to said fourth connector,
 a receiver coupled to and positioned in said fourth housing, said receiver being operationally coupled to said fourth microprocessor, said receiver being radio frequency enabled, said receiver being in communication with a sensor unit comprising a vehicle manufacturer installed Tire Pressure Monitoring Sensor, wherein the sensor unit is configured to measure pressure and positioned to send pressure readings to said receiver, wherein said fourth microprocessor is positioned to respond to pressure readings relayed from said receiver to motivate said air gun to send air via said outflow tube through the stem valve, and
 wherein the sensor unit is configured to measure pressure and positioned to send pressure readings to said receiver, wherein said fourth microprocessor is positioned to respond to pressure readings relayed from said receiver to motivate said air gun to send air via said outflow tube through the stem valve.

19. The assembly of claim 18, further including said receiver being radio frequency and infrared light enabled.

* * * * *